(12) United States Patent
Xue et al.

(10) Patent No.: US 8,918,518 B2
(45) Date of Patent: Dec. 23, 2014

(54) ACCESS SESSION CONTROLLER, IP MULTIMEDIA SUBSYSTEM AND REGISTRATION AND SESSION METHOD THEREOF

(75) Inventors: Haiqiang Xue, Beijing (CN); Congxing Ouyang, Beijing (CN); Bing Wei, Beijing (CN); Xiaoyun Wang, Beijing (CN)

(73) Assignee: China Mobile Communications Corporation, Beijing (CN)

( * ) Notice: Subject to any disclaimer, the term of this patent is extended or adjusted under 35 U.S.C. 154(b) by 1342 days.

(21) Appl. No.: 12/673,143

(22) PCT Filed: Mar. 21, 2008

(86) PCT No.: PCT/CN2008/000561

§ 371 (c)(1),
(2), (4) Date: Mar. 26, 2012

(87) PCT Pub. No.: WO2009/024006

PCT Pub. Date: Feb. 26, 2009

(65) Prior Publication Data

US 2012/0179827 A1     Jul. 12, 2012

(30) Foreign Application Priority Data

Aug. 21, 2007   (CN) .......................... 2007 1 0120519

(51) Int. Cl.
*G06F 15/16*     (2006.01)
*H04L 29/06*     (2006.01)
*H04W 12/06*     (2009.01)
*H04L 12/14*     (2006.01)

(52) U.S. Cl.
CPC ............ *H04L 65/1046* (2013.01); *H04L 63/08* (2013.01); *H04W 12/06* (2013.01); *H04L 65/105* (2013.01); *H04L 12/14* (2013.01); *H04L 65/1016* (2013.01)

USPC .......... 709/227; 709/203; 709/219; 709/225; 709/238

(58) Field of Classification Search
USPC .................. 709/203, 219, 225, 227, 228, 229
See application file for complete search history.

(56) References Cited

U.S. PATENT DOCUMENTS 5,577,209 A * 11/1996 Boyle et al. ........................ 726/4
6,223,289 B1 * 4/2001 Wall et al. ........................ 726/16
(Continued)

FOREIGN PATENT DOCUMENTS

CN         1716965         1/2006

OTHER PUBLICATIONS

"3rd Generation Partnership Project; Technical Specification Group Services and Systems Aspects; Network Architecture", (Release 6), 3GPP TS 23.002 V6. 10.0, Dec. 2005, 61 pages.

(Continued)

*Primary Examiner* — Michael Y Won
(74) *Attorney, Agent, or Firm* — Fulbright & Jaworski LLP

(57) ABSTRACT

Disclosed are an access session controller, an IP multimedia subsystem and registration and session establishment methods thereof, where the access session controller includes a message reception module, a service trigger configuration module, a session control module and a message transmission module. The IP multimedia subsystem includes the access session controller and a network-wide home subscriber server system. The registration method includes: initiating, by the access session controller, an authentication information request to the network-wide home subscriber server system. The session establishment method includes: directly process, by the access session controller, the request message initiated from a user to establish a session. The foregoing solutions can simplify the signaling processing flow and reduce the network complexity.

11 Claims, 15 Drawing Sheets

(56) References Cited

U.S. PATENT DOCUMENTS

| | | | |
|---|---|---|---|
| 6,359,880 B1 * | 3/2002 | Curry et al. | 370/352 |
| 6,615,264 B1 * | 9/2003 | Stoltz et al. | 709/227 |
| 7,043,752 B2 * | 5/2006 | Royer et al. | 726/8 |
| 7,292,870 B2 * | 11/2007 | Heredia et al. | 455/466 |
| 7,305,474 B2 * | 12/2007 | Giaffreda et al. | 709/227 |
| 7,600,024 B2 * | 10/2009 | Jodh et al. | 709/226 |
| 7,835,330 B2 * | 11/2010 | Parker | 370/338 |
| 8,539,020 B2 * | 9/2013 | Lotlikar et al. | 709/203 |
| 2006/0165083 A1 | 7/2006 | Lee | |
| 2009/0327498 A1 * | 12/2009 | Sampath et al. | 709/228 |
| 2012/0317236 A1 * | 12/2012 | Abdo et al. | 709/219 |

OTHER PUBLICATIONS

Zhai, Jusheng: "Analysis of IMS Architecture and Protocols", Telecom Engineering Technology and Standardization, Feb. 2006, 4 pages.

"3rd Generation Partnership Project; Technical Specification Group Services and System Aspects; IP Multimedia Subsystem (IMS); Stage 2", (Release 8) Jun. 2007, 226 pages. (cited as 2 documents, pp. 1-112 PART I; pp. 113-226 PART II due to document size).

International Search Report issued for PCT/CN2008/000561, dated Jul. 10, 2008, 3 pages.

* cited by examiner

US 8,918,518 B2

ACCESS SESSION CONTROLLER, IP MULTIMEDIA SUBSYSTEM AND REGISTRATION AND SESSION METHOD THEREOF

TECHNICAL FIELD

The present invention relates to an IP Multimedia Subsystem (IMS) network technology and particularly to an access session controller, an IMS and a method for establishing a session and for registering a user equipment.

BACKGROUND OF THE INVENTION

As illustrated in FIG. 16, an existing IMS network supported by an operation and charging support system 6 is divided into three layers of an access layer 9, a session control layer 8 and an application layer 7, the access layer 9 includes a GPRS Gateway Support Node (GGSN) 91, a Serving GPRS Support Node (SGSN) 92 and an IP access network 93, and a user equipment accessing the access layer 9 may enjoy a service provided by an IMS system. The IMS system located at the session control layer 8 in the network supports an IMS Service Control (ISC) interface 75, via which the IMS system may support application servers 71 and 73 based upon the Session Initiation Protocol (SIP) providing a supplementary service and a self-owned value-added service, and support a service capability server 74 based upon the Open Service Architecture (OSA) providing a third-party service as well as an original intelligence network service platform 72. The IMS system 10 having a structure as illustrated in FIG. 17 includes physical entities of a Proxy-Call Session Control Function (P-CSCF) module 161, an Interrogating-Call Session Control Function (I-CSCF) module 163, a Service-Call Session Control Function (S-CSCF) module 162, a Media Gateway Control Function (MGCF) module 14, a Multimedia Resource Function Controller (MRFC) 13, a Multimedia Resource Function Processor (MRFP) 11, an IMS Media Gateway (IMS-MGW) 12, a Breakout Gateway Control Function (BGCF) module 15, a Home Subscriber Server (HSS) 17, etc., where the S-CSCF 162 is a control core of the IMS system, the P-CSCF 161 is an entrance for an IMS user to access the network, the P-CSCF 161 forwards a service request from the user to the S-CSCF 162 for processing by a service platform of a home network; the MGCF 14 and the IMS-MGW 12 provide interconnectivity between the IMS system 10 and a Universal Mobile Telecommunications System (UMTS) network Circuit Switched (CS) domain or a Public Switched Telephone Network (PSTN) 1; the MRFC 13 and the MRFP 11 provide media resources and relevant control functions required in a service; and the BGCF 15, which is an interface point between an IMS network 2' and an external network, selects a connection point with the PSTN 1 of the CS domain. A legacy mobile signaling network 3 is connected with the HSS 17 via interfaces Gr, Gc, C and D; the IMS network 2' and the MRFP 11 are connected via an interface Mb, and the MRFP 11 and the IMS-MGW 12 are connected via an interface Mb; the PSTN 1 is connected with the IMS-MGW 12 and the MGCF 14 via interfaces PSTN; the IMS-MGW 12 and the MGCF 14 are connected via an interface Mn; the BGCF 15 is connected with another BGCF 15 and the IMS network 2' via interfaces Mk; the BGCF 15 and the MGCF 14 are connected via an interface Mj; the MGCF 14 and the S-CSCF 162 are connected via an interface Mg; the MRFP 11 and the MRFC 13 are connected via an interface Mp; the MRFC 13 and the S-CSCF 162 are connected via an interface Mr; the BGCF 15 and the S-CSCF 162 are connected with an interface Mi; the S-CSCF 162 is connected with the P-CSCF 161 and the I-CSCF 163 via interfaces Mw; the IMS network 2' and the S-CSCF 162 are connected via an interface Mm; the S-CSCF 162 is connected with the HSS 17, the SLF 18 and an application server (AS) 5 respectively via interfaces Cx, Dx and ISC; the P-CSCF 161 and a user equipment 4 are connected via an interface Gm; and the AS 5 is connected with the HSS 17 and the SLF 18 respectively via interfaces Sh (Si) and Dh. Reference may be made to the standard 3GPP TS 23.002 for details of the foregoing interfaces.

The existing IMS system suffers from such drawbacks that the system is of such a complicated structure that excessive operations are involved in a call signaling processing flow, resulting in a prolonged flow of establishing a session. For example, to establish a call session, an initial call request (Invite) message transmitted from a calling user firstly arrives at a P-CSCF of the calling user, which in turn routes the Invite message to an S-CSCF of a calling user to trigger a service; then an I-CSCF in a network of the called user determines a home S-CSCF of the called user, and the Invite message arrives at the home S-CSCF of the called user to trigger the service and then is transmitted to a home P-CSCF of the called user and finally to the called user. If both the calling user and the called user are roaming, the call signaling flow will be even more complicated to cause more signaling interactions in the network and hence an increased delay during the session establishment procedure.

BRIEF SUMMARY OF THE INVENTION

An aspect of embodiments of the invention lies in provision of an access session controller to simplify a signaling processing flow.

Another aspect of the embodiments of the invention lies in provision of an IP multimedia subsystem to simplify the signaling processing flow and reduce complexity of a network.

A further aspect of the embodiments of the invention lies in provision of a method for establishing a session via an IP multimedia subsystem to simplify a session establishment flow, shorten the duration of session establishment and improve the session establishment efficiency.

A further aspect of the embodiments of the invention lies in provision of a method for registering a user equipment via an IP multimedia subsystem to simplify the user equipment registration flow and improve the registration efficiency.

An aspect of the invention provides in some embodiments an access session controller, which includes a message reception module, a session control module, a service trigger configuration module and a message transmission module. The message reception module is adapted to receive a call request message and a response message from a user or a call request message and a response message from a network device; the service trigger configuration module is adapted to configure trigger information; the session control module is adapted to generate a command for transmitting a message triggering a corresponding application server and establish, maintain and release a session upon determining from the trigger information configured by the service trigger configuration module that the call request message or the response message satisfies a condition of triggering the application server, and to generate during establishment of the session a command to transmit the call request message directly to an access session controller at the side of a called user or a corresponding breakout gateway control function module; and the message transmission module is adapted to transmit the message according to the command from the session control module.

With the service trigger configuration module and the session control module, the inventive solution enables the call request message transmitted from a user to be transmitted directly to an access session controller at the side of the called user, so that when the called user and the calling user pertain to the same access session controller, signaling in a signaling flow between the calling and called users can be transmitted to the counterpart of calling and called parties after being processed by the only access session controller to thereby simplify the signaling processing flow and improve the efficiency of processing the call request message.

Another aspect of the invention provides in some embodiments an IP multimedia subsystem including the access session controller and a network-wide home subscriber server system connected with the access session controller and adapted to store network-wide subscriber information and indexes thereof for inquiring by the access session controller.

With the access session controller, this solution can enable the IP multimedia subsystem to directly process the request message transmitted from the user or trigger it to the corresponding application server through the access session controller to thereby simplify the signaling processing flow and improve the signaling processing efficiency. Furthermore, the IP multimedia subsystem can also be simplified greatly due to the network-wide home subscriber server system.

Another aspect of the invention provides in some embodiments a method for establishing a session via an IP multimedia subsystem, which includes: receiving a call request message by an access session controller in the IP multimedia subsystem; triggering, by the access session controller, a corresponding application server upon determining from configured trigger information that the call request message satisfies a condition of triggering the application server; and establishing, by the access session controller, a session according to a message returned from the corresponding application server.

With the access session controller, this solution can enable the call request message transmitted from a user to be routed directly to an access session controller at the side of a called user, so that when the called user and the calling user pertain to the same access session controller, signaling in a signaling flow between the calling and called users can be transmitted to the calling and called parties to perform corresponding operations after being processed by only the access session controller to thereby avoid multiple forwarding of the call request message, simplify the session establishment flow and improve the session establishment efficiency.

A further aspect of the invention provides in some embodiments a method for registering a user equipment in an IP multimedia subsystem, which includes:

transmitting, by an access session controller in the IP multimedia subsystem, a multimedia authentication request message to a network-wide home subscriber server system upon reception of a registration request message transmitted from the user equipment;

returning, by the network-wide home subscriber server system, to the access session controller an authentication condition for a user transmitting the registration request message; and retrieving, by the access session controller, authentication information of the user from the user equipment, transmitting a server assignment request message to the network-wide home subscriber server system upon determining that the authentication information satisfies the authentication condition, and returning a registration success message to the user upon reception of a server assignment answer message and relevant data of the user returned from the network-wide home subscriber server system; and transmitting a registration failure message to the user upon determining that the authentication information does not satisfy the authentication condition.

With the access session controller in the inventive solution, the network-wide home subscriber server system may be requested for authentication information directly according to the registration request message transmitted from the user to thereby avoid multiple forwarding of the registration request message, simplify the registration flow and improve the registration efficiency.

The technical solutions of the invention will be further described in detail hereinafter with reference to the drawings and the embodiments.

DETAILED DESCRIPTION OF THE INVENTION

First Embodiment of Controller

Figure 1:
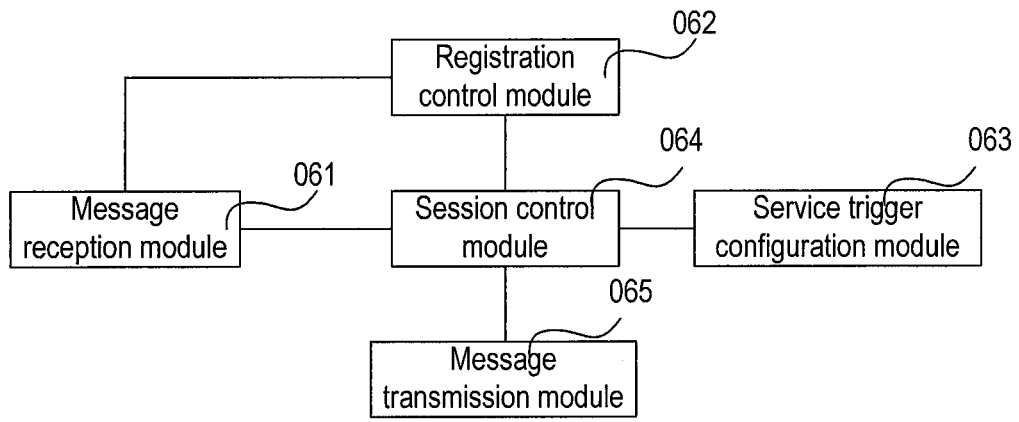
FIG. 1 is a structural schematic diagram of a first embodiment of an access session controller according to the invention.

FIG. 1 is a structural schematic diagram of the first embodiment of an access session controller according to an embodiment of the invention, which includes a message reception module 061, a registration control module 062, a service trigger configuration module 063, a session control module 064 and a message transmission module 065, where the message reception module 061 is adapted to receive a registration request message, a call request message and a response message from a user equipment, or receive a call request message and a response message from a network device, e.g., an application server, and a message transmitted from the user equipment can be transmitted directly to the access session controller without being forwarded through an existing P-CSCF or I-CSCF; and the registration control module 062 is adapted to control a registration procedure of a user, and specifically in the registration procedure, the registration control module 062 requests authentication information of the user equipment from a network-wide home subscriber server system upon reception of the registration request message from the message reception module 061, determines from the authentication information retrieved from the network-wide home subscriber server system whether the user has been authenticated, and reports registration status information, e.g., whether the user has been registered, to the network-wide home subscriber server system to maintain the registration status information of the user in a subsequent procedure, so that the access session controller can control directly the registration procedure of the user equipment. The service trigger configuration module 063 is adapted to store and configure trigger information, e.g., a table of correspondence relationships between called numbers and Uniform Resource Identifiers (URIs) of corresponding application servers. The session control module 064 compares the call request or response message with the trigger information stored in the service trigger configuration module 063 and determines whether a trigger condition is satisfied, for example, whether a called number in the call request message is stored in the service trigger configuration module 063, and when the trigger condition is satisfied, the session control module 064 is linked to a URI corresponding to the called number to trigger a corresponding application server so as to avoid multiple forwarding of the call request message from the P-CSCF to an S-CSCF and even from the P-CSCF to the I-CSCF and further to the S-CSCF before the application server is triggered, thereby simplifying greatly the flow of processing the call request message and improving the efficiency of processing the call request. The session control module 064 further establishes and maintains a session table according to the call request message received by the message reception module 061 and releases a session at the end of the session in a processing flow similar to that in the prior art except that it is executed by the access session controller according to an embodiment of the invention; the session control module 064 rejects establishment of the session when the call request message does not satisfy the trigger condition or the application server triggered by the session control module 064 returns a message indicating that the user is not qualified for the session, for example, due to an insufficient balance of an account in the case of a prepaying user; and when the session control module 064 triggers the corresponding application server or rejects establishment of the session, the session control module 064 firstly generates a command to transmit a corresponding message, e.g., a command to transmit the call request message, the response message and a session establishment rejection message, and the message transmission module 065 executes the transmission. During establishment of the session, the session control module 064 generates a command to route the call request message directly to an access session controller at the side of a called user or a corresponding breakout gateway control function module, and the message transmission module 065 executes the command from the session control module 064 to transmit the call request message. The message reception module 061 and the message transmission module 065 can be coupled together. Particularly, the call request message is initiated from an authenticated user determined by the registration control module 062 or initiated from a network device, or initiated according to a network deployment strategy from an unauthenticated user and at this time the registration control module 062 can be omitted in the access session controller, for example, the registration is not required when a user dials an emergency telephone number, e.g., 110. At the end of the session, the session control module 064 processes a session release request message to release the session. Particularly, reference may be made to descriptions of an embodiment of an IP multimedia subsystem for details of the network-wide home subscriber server system.

Second Embodiment of Controller

Figure 2:
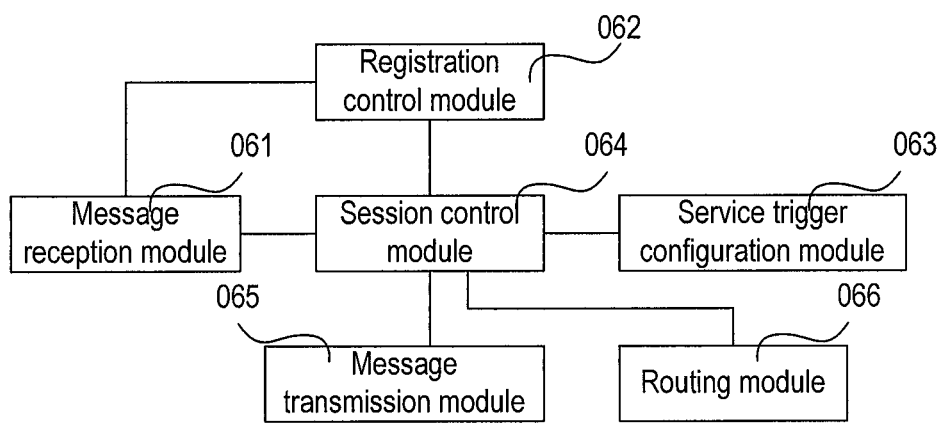
FIG. 2 is a structural schematic diagram of a second embodiment of an access session controller according to the invention.

FIG. 2 is a structural schematic diagram of a second embodiment of an access session controller according to an embodiment of the invention, which further includes a routing module 066 based upon the foregoing embodiment, the routing module 066 is adapted to inquire, with a user identifier in the call request message. the network-wide home subscriber server system and a corresponding server executing a domain name service (simply a DNS) and obtain address information for next-hop forwarding of the message, e.g., address information of an access session controller of the opposite party, or address information of a BGCF, in combination with a relevant routing strategy. The session control module 064 releases the session, establishes the session between the user and the application server or routes the call request message to the called party according to the message returned from the triggered application server; and in order to route the call request message to the called party, the session control module 064 forwards the call request message directly to the access session controller of the called party according to the address information obtained by the routing module 066 or further forwards the message returned from the triggered application server to the access session controller of the called party in the case that the trigger condition is satisfied, thus avoiding multiple forwarding of the call request message from the P-CSCF to the S-CSCF of the caller to the S-CSCF of the callee and even from the P-CSCF to the I-CSCF and further to the S-CSCF of the caller and further to the I-CSCF and further to the S-CSCF of the callee before being transmitted to the call session control module of the called party to thereby simplify greatly the flow of processing the call request message, improve the efficiency of processing the call request message and shorten the duration of session establishment.

In the foregoing embodiment, the session control module 064 is further adapted to maintain status information of the session. In the event that each of a plurality of users initiates a call request message, the session control module 064 further associates other messages generated in the procedure of processing the call request message of the user according to the user identifier of the user, so that the access session controller can exactly process the call request message of each user.

Based upon the foregoing embodiment, the access session controller further includes a signaling compression module adapted to compress an SIP message to save a network transmission bandwidth.

Based upon the foregoing embodiment, the access session controller further includes a charging module adapted to charge for the session established according to the call request message, for example, via a Call Detail Record (CDR).

Embodiment of System

Figure 3:
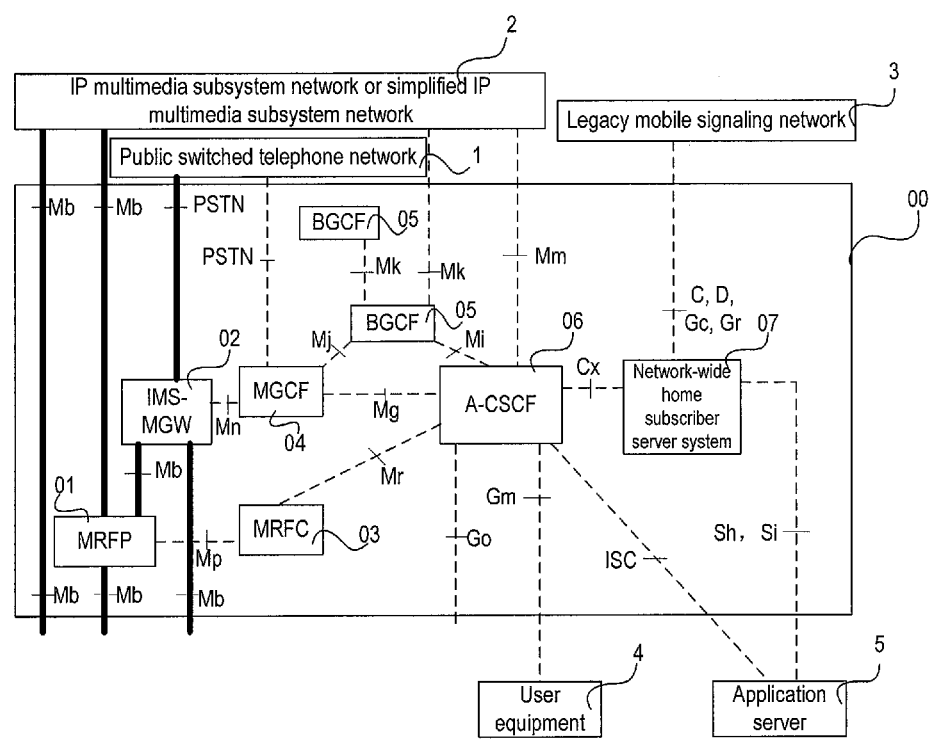
FIG. 3 is a structural schematic diagram of an embodiment of an IP multimedia subsystem according to the invention.

FIG. 3 is a structural schematic diagram of an embodiment of an IP multimedia subsystem according to an embodiment of the invention. As shown in FIG. 3, an IP multimedia subsystem (IMS) 00 is connected in communication with a Public Switched Telephone Network (PSTN) 1, an IP multimedia subsystem network or a simplified IP multimedia subsystem network 2, a legacy mobile signaling network 3, a user equipment 4 and an application server 5. The IMS 00 includes an MRFP 01, an IMS-MGW 02, an MRFC 03, an MGCF 04, a BGCF 05, an Access Session Controller (A-CSCF) 06 and a network-wide home subscriber server system 07. Particularly, the MRFC 03 parses information of the A-CSCF 06 and executes a corresponding operation, for example, to subscribe for, release or modify a resource; the MGCF 04 selects an A-CSCF 06 according to a called number and an incoming call condition and performs conversion of call control protocols between the PSTN 1 and the IMS 00; the BGCF 05 selects an appropriate interface point of the PSTN 1 or the CS domain according to the call request from the A-CSCF 06 to thereby route the call request to a network connected with the interface point of the PSTN 1 or the CS domain or to another IMS network or to the simplified IMS network 2 consisted of the IMS system according to an embodiment of the invention; the A-CSCF 06 routes the call request from the user equipment 4 to a corresponding network element, for example, triggers and routes the call request to the corresponding application server 5 when determining that the call request satisfies a trigger condition; and the A-CSCF 06 retrieves authentication information from the network-wide home subscriber server system 07 according to a registration request transmitted from the user equipment 4 to verify legitimacy of the user equipment 4, i.e., whether it has been authenticated. The A-CSCF 06 can be implemented with the A-CSCF in the foregoing embodiments of the controller. The network-wide home subscriber server system 07 may store network-wide subscriber information, e.g., authentication and authorization information, accessed A-CSCF information and service information of subscribers, and indexes corresponding to the information by separating the data from the indexes to thereby expand the amount of stored data as desired and satisfy a demand for storing the network-wide subscriber information data, and the network-wide home subscriber server system may be constructed with a product such as an MmHLR server from UTSTARCOM Corp. and a large distributed database from Oracle Corp. The IP multimedia subsystem can be simplified greatly due to the A-CSCF and the network-wide home subscriber server system.

Figure 4:
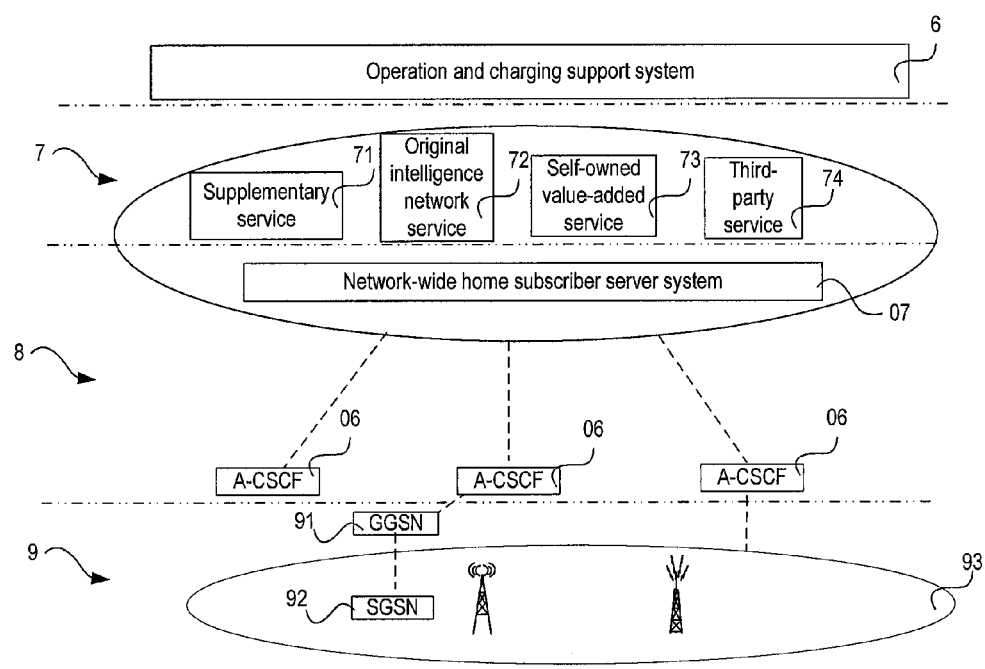
FIG. 4 is a structural schematic diagram of an IP multimedia subsystem network based upon FIG. 3.

An IMS network consisted of the foregoing embodiment of the system may also be simplified greatly, and as illustrated in FIG. 4, a unified network-wide home subscriber server system 07 may be constructed with a distributed computer technology, so that it is not necessary to distinguish between a home area and a roam area, and the session control functions in the respective areas may be implemented with the unified A-CSCFs 06.

Embodiment of Registration Method

Figure 5:
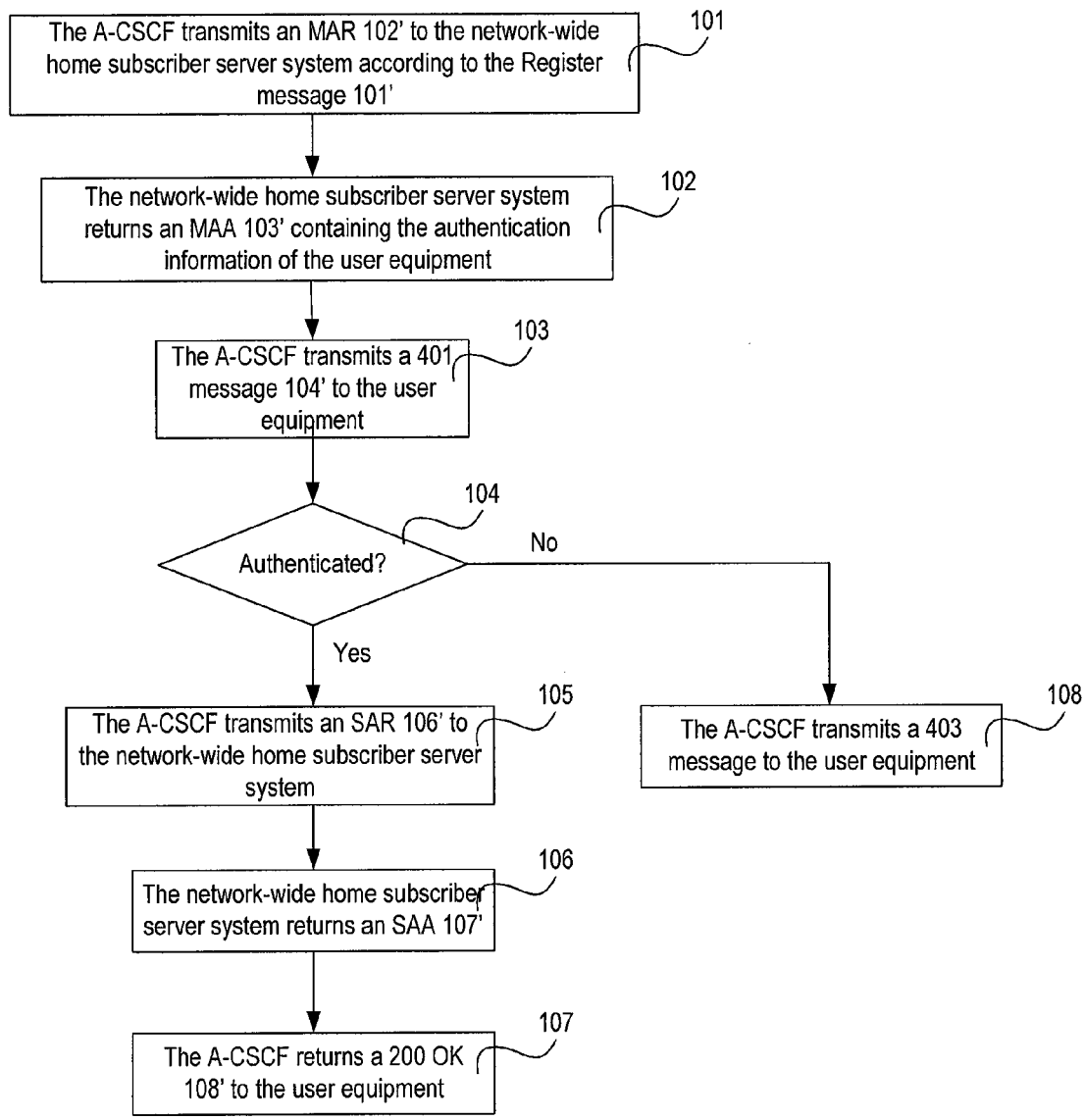
FIG. 5 is a flow chart of an embodiment of a method for registering a user equipment via an IP multimedia subsystem according to the invention.
Figure 6:
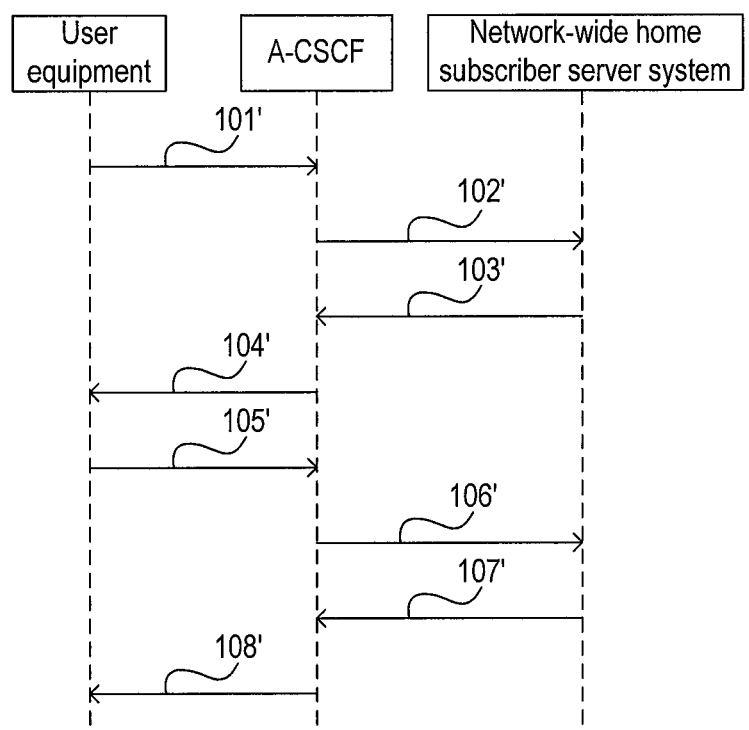
FIG. 6 is a flow chart of signaling corresponding to FIG. 5.

To use a subscribed service via a user equipment, the user is firstly required to be registered to be authorized for use, that is, the user shall be registered before the A-CSCF determines whether the call request message transmitted from the user satisfies a condition of triggering an application server, as illustrated in FIG. 5. FIG. 5 is a flow chart of an embodiment of a method for registering a user equipment via an IP multimedia subsystem according to an embodiment of the invention, and FIG. 6 is a flow chart of signaling corresponding to FIG. 5. It is assumed that a user equipment accessing a user access network (IP CAN) is assigned with an A-CSCF through a dynamic host configuration protocol (DHCP) and a DNS inquiring mechanism and then initiates to the assigned A-CSCF a registration request (Register) message containing ID information of the assigned A-CSCF. A specific procedure to register the user equipment via the IMS includes:

Process 101: The A-CSCF transmits a Multimedia Authentication Request (MAR) message 102' directly to the network-wide home subscriber server system upon reception of the "Register" message 101' to request the network-wide home subscriber server system for authentication information relevant to the user equipment requesting for registration to thereby simplify greatly the flow of processing the Register message.

Process 102: The network-wide home subscriber server system returns to the A-CSCF a Multimedia Authentication Acknowledgement (MAA) message 103' containing the authentication information of the user equipment.

Process 103: The A-CSCF transmits a Un-Authorization (401) message 104' to the user equipment according to the received authentication information of the user equipment to initiate an authentication challenge to the user equipment.

Process 104: The A-CSCF receives a "Register" message 105' retransmitted from the user equipment to the network, which contains authentication information stored in the user equipment itself, and determines whether the authentication information transmitted from the user equipment matches that transmitted from the network-wide home subscriber server system to thereby determine whether the user equipment has been authenticated. If the user equipment has been authenticated, the flow goes to Process 105; otherwise, the flow goes to Process 108.

Process 105: The A-CSCF transmits a Server Assignment Request (SAR) message 106' to the network-wide home subscriber server system to request the network-wide home subscriber server system to store ID information of the present A-CSCF, and thereafter the present A-CSCF or another A-CSCF upon reception of a call request message of the user equipment acting as a callee can obtain the A-CSCF serving the user through inquiring the network-wide HSS according to the ID information and route the call request message to the A-CSCF corresponding to the ID information for call switching.

Process 106: The network-wide home subscriber server system returns to the A-CSCF a Server Assignment Acknowledgement (SAA) message 107' to accept the request of the A-CSCF and returns service data relevant to the user equipment.

Process 107: The A-CSCF returns a registration success message (200 OK) 108' to the user equipment for successful registration.

Process 108: The A-CSCF transmits a registration failure (403) message to the user equipment.

The present embodiment can assign directly the user equipment with the A-CSCF in the access network to receive the registration request message of the user equipment to thereby avoid multiple forwarding of the registration request message among the P-CSCF, the S-CSCF and the I-CSCF, so that the multimedia authentication request can be initiated directly from the A-CSCF to the network-wide HSS after the user equipment transmits the registration request message, to thereby simplify greatly the registration flow and improve the registration efficiency.

The user registered successfully can use the subscribed service, and a session may be established through the IMS system according to the embodiments of the invention.

First Embodiment of Session Establishment Method

Figure 7:
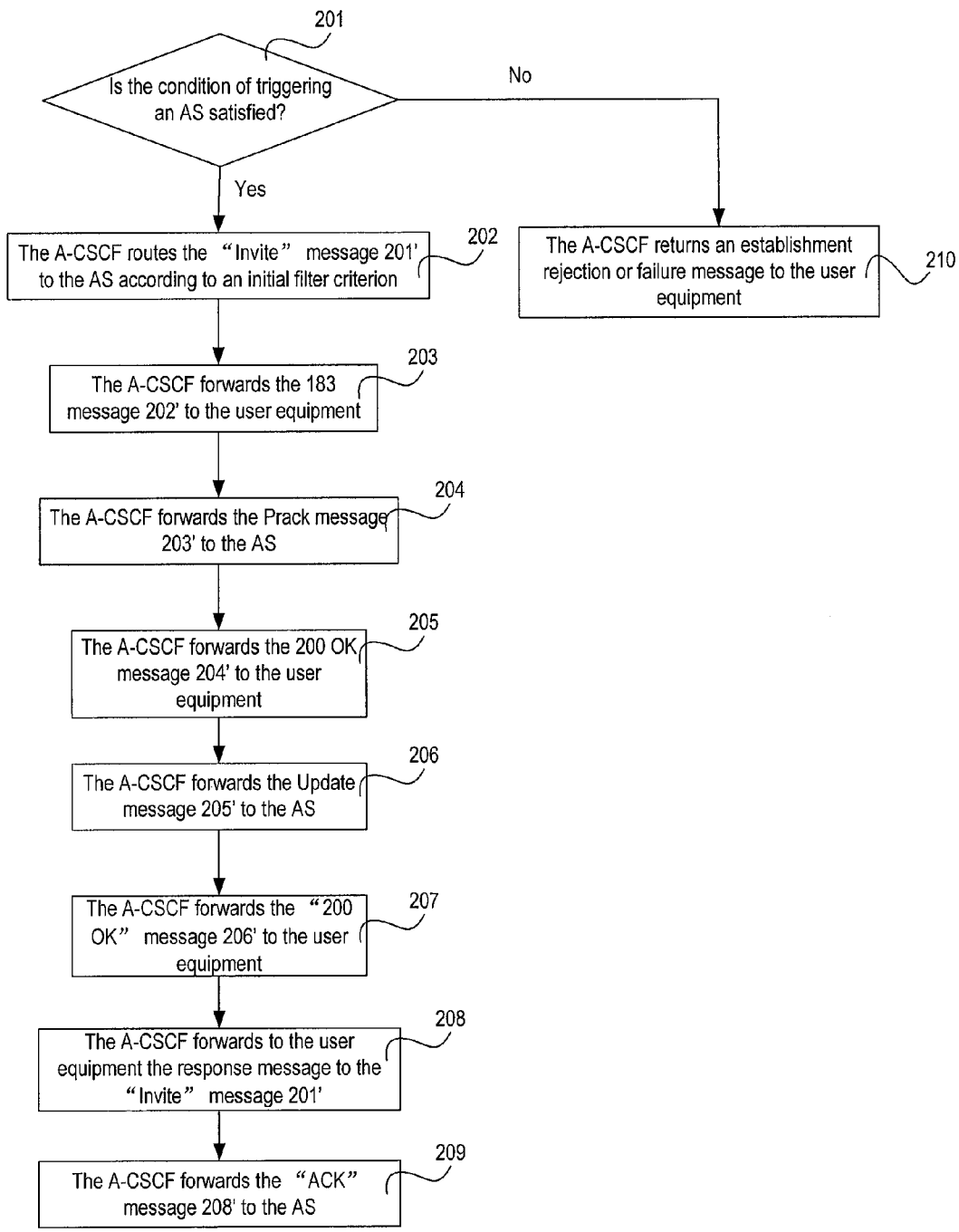
FIG. 7 is a flow chart of a first embodiment of a method for establishing a session via an IP multimedia subsystem according to the invention.
Figure 8:
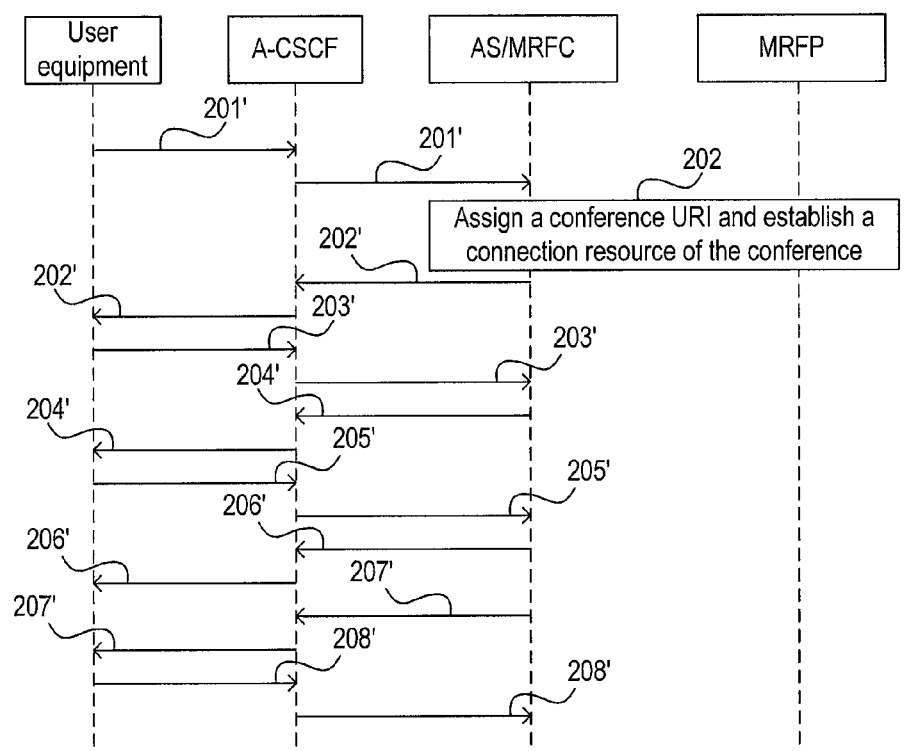
FIG. 8 is a flow chart of signaling corresponding to FIG. 7.

FIG. 7 is a flow chart of a first embodiment of a method for establishing a session via an IP multimedia subsystem according to an embodiment of the invention, and FIG. 8 is a flow chart of signaling corresponding to the method shown in FIG. 7. It is assumed that a user equipment initiates a conference establishment request to any IMS according to the foregoing embodiments of the system, and a Uniform Resource Identifier (URI) of a conference factory is used in an initial call request (Invite) message 201' because no conference instance has been created at that time. A procedure to establish a session via the IMS includes:

Process 201: The A-CSCF in the IMS determines whether the "Invite" message 201' satisfies the condition of triggering an AS upon reception of the "Invite" message 201', and if the "Invite" message 201' satisfies the condition of triggering an AS, the flow goes to Process 202; otherwise, the flow goes to Process 210.

Process 202: The A-CSCF routes the "Invite" message 201' to the AS according to an initial Filter Criterion (iFC). Since the user equipment uses the URI of the conference factory to request for the conference, the AS upon reception of the "Invite" message 201' assigns a URI of a conference instance and transmits Session Description Protocol (SDP) information available during the conference to the A-CSCF via a session progress (183) message 202'; and a connection resource of the conference is created in the MRFP.

Process 203: The A-CSCF forwards the "183" message 202' to the user equipment, and upon reception of the "183" message 202', the user equipment transmits the SDP information selected by the user to the A-CSCF via a provisional acknowledgement (Prack) message 203' and applies for a local resource.

Process 204: The A-CSCF forwards the "Prack" message 203' to the AS, and the AS responds to the "Prack" message 203' of the user equipment by transmitting to the A-CSCF a response message (200 OK) 204' which may carry the SDP information.

Process 205: The A-CSCF forwards the "200 OK" message 204' to the user equipment, and the user equipment updates the SDP information and transmits the updated SDP information to the A-CSCF via a update message (Update) 205'.

Process 206: The A-CSCF forwards the "Update" message 205' to the AS, the AS transmits to the A-CSCF a "200 OK" message 206' in response to the "Update" message 205', and the MRFP activates a media connection with the user equipment.

Process 207: The A-CSCF forwards the "200 OK" message 206' to the user equipment.

Process 208: The A-CSCF receives a response message (a "200 OK" message 207' with the "Contact" header carrying the URI of the conference instance) in response to the "Invite" message 201', which is returned from the AS, and forwards the response message to the user equipment; and upon reception of the "200 OK" message 207' carrying the URI of the conference instance, the user equipment transmits to the A-CSCF an acknowledgement message (ACK) 208' acknowledging the "Invite" message, to acknowledge successful establishment of the conference.

Process 209: The A-CSCF forwards the "ACK" message 208' to the AS to complete the present establishment of the session.

Process 210: The A-CSCF returns an establishment rejection or failure message to the user equipment.

In the present embodiment, when the calling user equipment uses a prepaid service, the A-CSCF upon reception of the "Invite" message initiated from the user equipment firstly triggers an application server of the prepaid service and determines from a message returned from the application server of the prepaid service whether the user equipment is still capable of paying for the present service, and if the user equipment is still capable of paying for the present service, the A-CSCF further determines whether the "Invite" message satisfies a condition of triggering another application server and further triggers the application server of conference establishment, for example, upon satisfaction of a condition of triggering the application server of conference establishment in the present embodiment. If the user has an account with an insufficient balance, the application server returns a message to the A-CSCF to notify the A-CSCF about the insufficient balance of the user account, and the A-CSCF transmits a message to the user equipment according to the message returned from the application server to reject establishment of the session.

The present embodiment may enable the "Invite" message of the user equipment to be received through the A-CSCF to thereby avoid multiple forwarding thereof among the P-CSCF, the S-CSCF and the I-CSCF before the AS is triggered, so that the AS can be triggered directly by the A-CSCF after the user equipment transmits the "Invite" message to thereby simplify greatly the session establishment or call flow, shorten the period of time for session establishment and improve the session establishment efficiency.

Second Embodiment of Session Establishment Method

Figure 9:
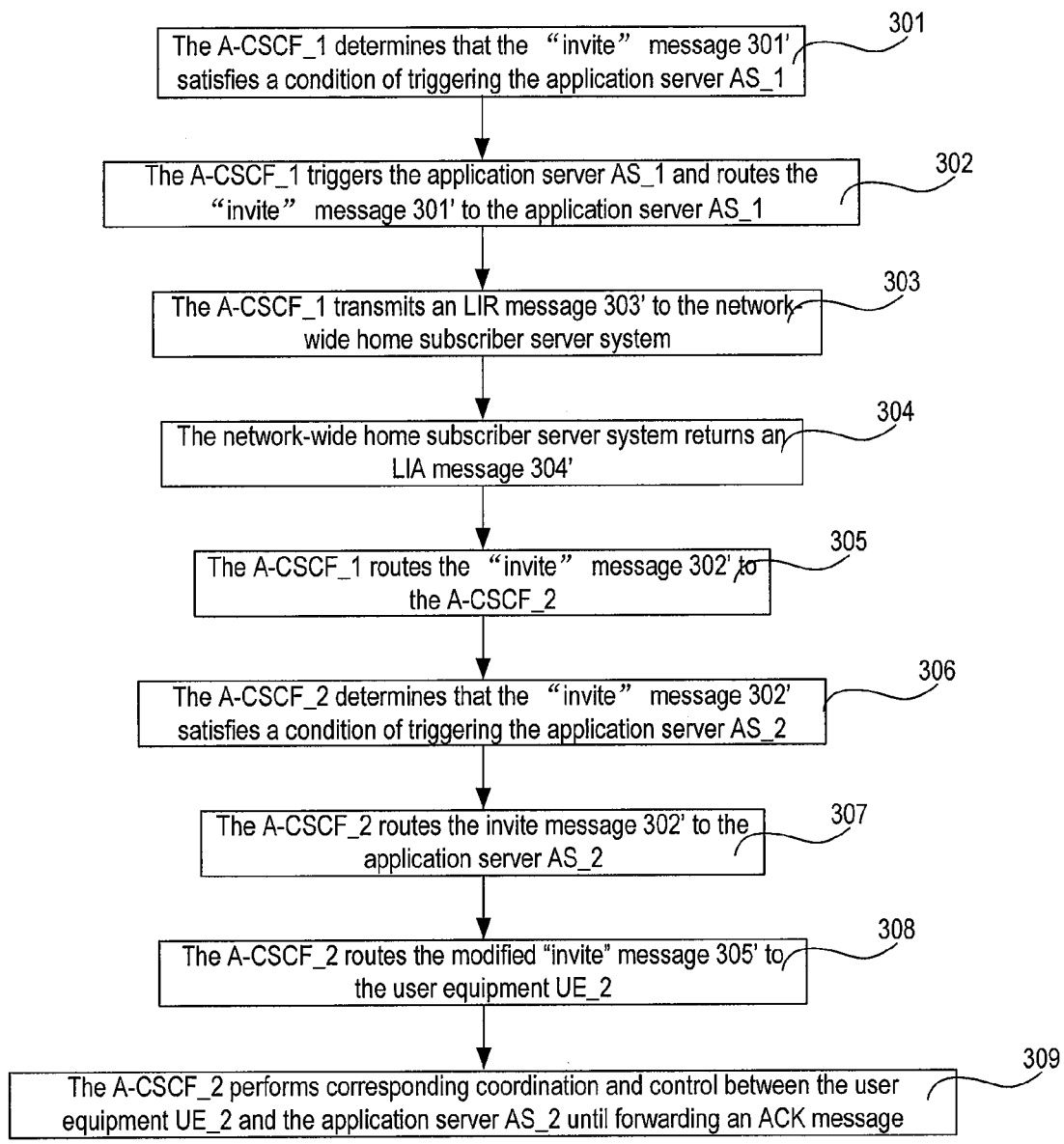
FIG. 9 is a flow chart of a second embodiment of a method for establishing a session via an IP multimedia subsystem according to the invention.
Figure 10:
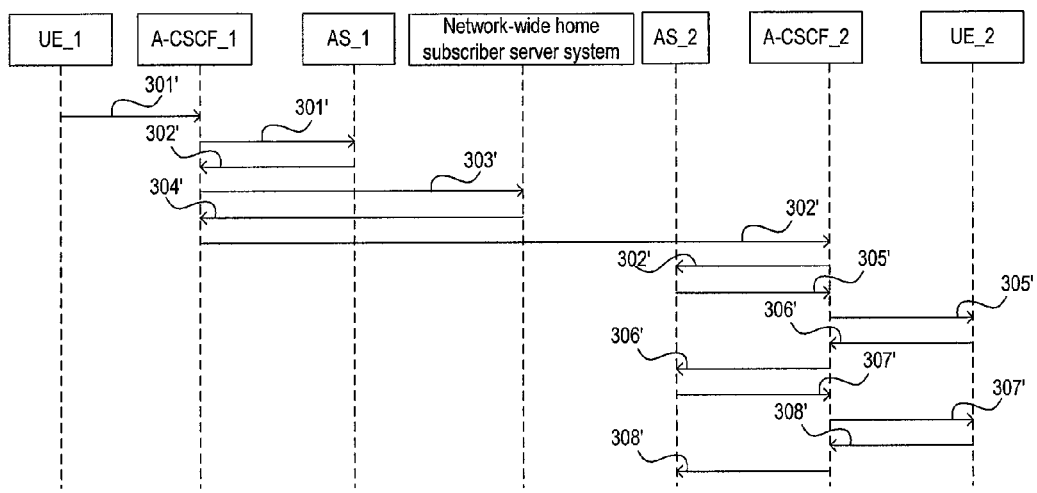
FIG. 10 is a flow chart of signaling corresponding to FIG. 9.

FIG. 9 is a flow chart of a second embodiment of a method for establishing a session via an IP multimedia subsystem according to an embodiment of the invention, and FIG. 10 is a flow chart of signaling corresponding to the method of FIG. 9. It is assumed that a user equipment UE_1 with subscription for a calling number display restriction service transmits to any IMS network according to the foregoing embodiments of the system an "invite" message 301' to call another user equipment UE_2 with subscription for a calling number display service. The user equipment UE_1 corresponds to an A-CSCF referred to as A-CSCF_1, and the calling number display restriction service corresponds to an application server referred to as AS_1; and the user equipment UE_2 corresponds to an A-CSCF referred to as A-CSCF_2, and the calling number display service corresponds to an application server referred to as AS_2. A procedure for the IMS network at the side of the called user equipment to establish the session includes:

Process 301: The A-CSCF_1 determines whether the "invite" message 301' satisfies a condition of triggering an AS (the "invite" message 301' satisfies a condition of triggering the application server AS_1 in the present embodiment) upon reception of the "invite" message 301'.

Process 302: The A-CSCF_1 triggers the application server AS_1 by routing the "invite" message 301' thereto; and the application server AS_1 executes a relevant service control logic of, for example, modifying a value of the "Privacy" header in the "invite" message 301' to "id", upon reception of the "invite" message 301', and then transmits a modified "invite" message 302' to the A-CSCF_1.

Process 303: The A-CSCF_1 transmits a Location Information Request (LIR) message 303' to the network-wide home subscriber server system to request for inquiring about location or address information of the A-CSCF at the side of the user equipment UE_2.

Process 304: The network-wide home subscriber server system returns a Location Information Answer (LIA) message 304' carrying the location or address information of the A-CSCF at the side of the user equipment UE_2, the A-CSCF_2 in the present embodiment.

Process 305: The A-CSCF_1 routes the "invite" message 302' to the A-CSCF_2 according to the LIA message 304'.

Process 306: The A-CSCF_2 determines whether the "invite" message 302' satisfies a condition of triggering an AS. In the present embodiment, it is determined that the "invite" message 302' satisfies a condition of triggering the application server AS_2.

Process 307: The A-CSCF_2 routes the "invite" message 302' to the application server AS_2; and the application server AS_2 knows from the "Privacy" value in the "invite" message 302' that the calling number can not be displayed and thus modifies a display name in the "invite" message 302' to "anonymous" and then transmits a modified "invite" message 305' to the A-CSCF_2.

Process 308: The A-CSCF_2 routes the modified "invite" message 305' to the user equipment UE_2.

Process 309: The A-CSCF_2 performs corresponding coordination and control (e.g., forwarding a "183" message 306', a "Prack" message 307', and "200 OK" message 308') between the user equipment UE_2 and the application server AS_2 as required for the service until forwarding an "ACK" message to complete establishment of the session.

It should be noted that the A-CSCF_1 and the A-CSCF_2 are the same A-CSCF when both the user equipment UE_1 and the user equipment UE_2 are served by one A-CSCF or in an area served by one A-CSCF.

The present embodiment may enable the "invite" message to be received through the A-CSCF to thereby avoid multiple forwarding thereof among the P-CSCF, the S-CSCF and the I-CSCF of calling and called parties before the AS is triggered, so that the AS can be triggered directly by the A-CSCF according to the "invite" message after the user equipment transmits the "invite" message to thereby simplify greatly the session establishment or call flow, shorten the period of time for session establishment and improve the session establishment efficiency.

Third Embodiment of Session Establishment Method

Figure 11:
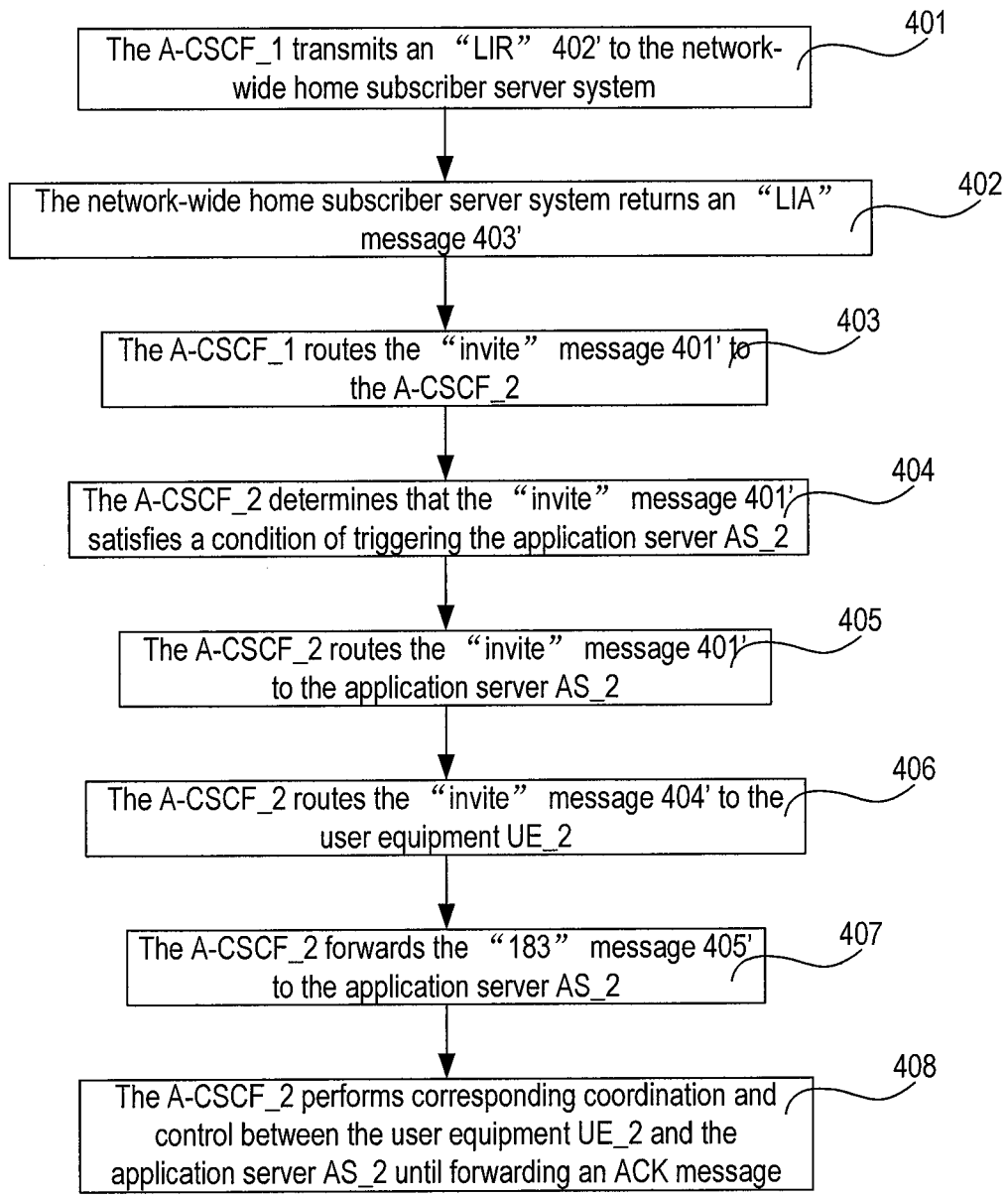
FIG. 11 is a flow chart of a third embodiment of a method for establishing a session via an IP multimedia subsystem according to the invention.
Figure 12:
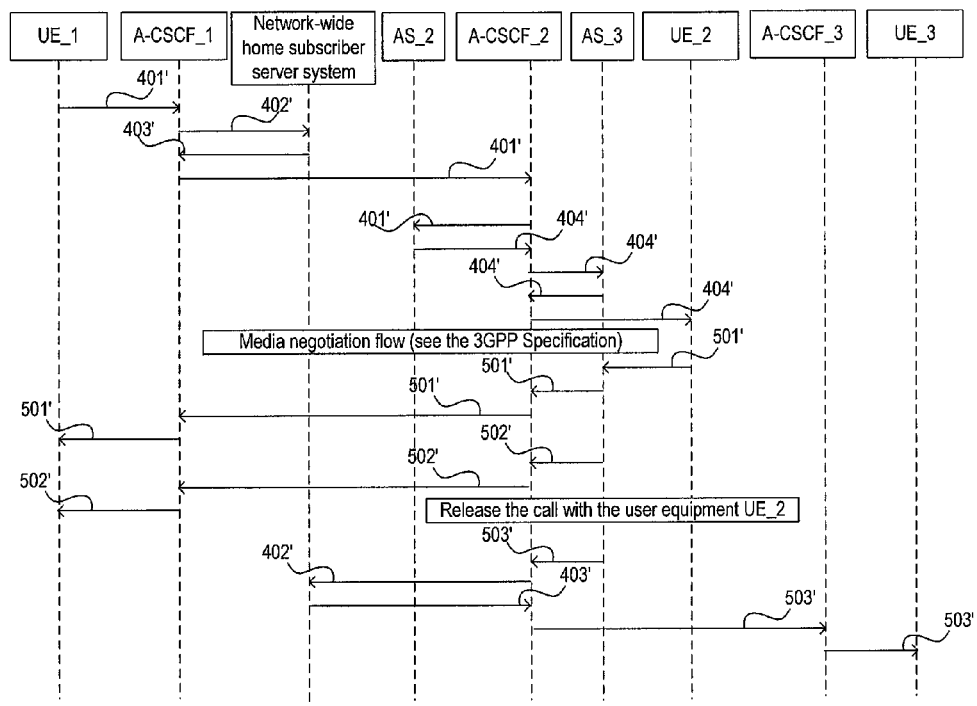
FIG. 12 is a flow chart of signaling corresponding to FIG. 11.

FIG. 11 is a flow chart of a third embodiment of a method for establishing a session via an IP multimedia subsystem according to an embodiment of the invention, and FIG. 12 is a flow chart of signaling corresponding to FIG. 11. Taking a supplementary service of calling number display as an example, it is assumed that a user equipment UE_1 transmits to any IMS according to the foregoing embodiments of the system an "invite" message 401' to call another user equipment UE_2. The user equipment UE_1 corresponds to an A-CSCF referred to as A-CSCF_1, and the user equipment UE_2 corresponds to an A-CSCF referred to as A-CSCF_2. A procedure for the IMS network at the side of the called user equipment to establish the session includes:

Process 401: When determining that the "invite" message 401' does not satisfy a condition of triggering an AS, the A-CSCF_1 transmits an "LIR" message 402' to the network-wide home subscriber server system to request for inquiring about the A-CSCF at the side of the user equipment UE_2.

Process 402: The network-wide home subscriber server system returns to the A-CSCF_1 an "LIA" message 403' carrying address information of the A-CSCF at the side of the user equipment UE_2, the A-CSCF_2 in the present embodiment.

Process 403: The A-CSCF_1 routes the "invite" message 401' to the A-CSCF_2 according to the "LIA" message 403' returned from the network-wide home subscriber server system.

Process 404: The A-CSCF_2 determines whether the "invite" message 401' satisfies a condition of triggering an AS, and the "invite" message 401' satisfies a condition of triggering the application server AS_2 assumed as an application server of a calling number display service in the present embodiment.

Process 405: The A-CSCF_2 routes the "invite" message 401' to the application server AS_2 according to an iFC; and the application server AS_2 firstly determines whether the "invite" message 401' carries the "Privacy" header and if it is not carried or has a value other than "id" or "user", which indicates that the user equipment UE_1 does not use a Calling Line Identification Restriction (CLIR) service, the application server AS_2 modifies the "invite" message 401' to an "invite" message 404' according to the "P-Asserted-Identity" header in the "invite" message 401' so as to display the user number of the user equipment UE_1 to the user equipment UE_2 and transmits the "invite" message 404' to the A-CSCF_2.

Process 406: The A-CSCF_2 routes the "invite" message 404' to the user equipment UE_2; and the user equipment UE_2 displays the user number of the user equipment UE_1 according to the calling user information modified by the application server AS_2 in the "invite" message 404'. It should be noted that a specific header containing information to be displayed as a calling number may vary from one network to another and further detailed description is omitted here. Then, the user equipment UE_2 transmits a "183" message 405' to the A-CSCF_2.

Process 407: The A-CSCF_2 forwards the "183" message 405' to the application server AS_2.

Process 408: The A-CSCF_2 performs corresponding coordination and control (e.g., forwarding a "Prack" message, a "200 OK" message) between the user equipment UE_2 and the application server AS_2 as required for the service until forwarding an "ACK" message to complete establishment of the session. These subsequent messages can be processed similarly to interaction logic of a basic call flow in an existing IMS network except that the session process is accomplished by the A-CSCFs of the calling and called parties in the present embodiment.

In the present embodiment, when the user equipment UE_2 uses a prepaid service and has an account with an insufficient balance, the application server AS_2 upon determining the insufficient balance of his account notifies the A-CSCF_2 about that information, and the A-CSCF_2 rejects establishment of the session and notifies the user equipment UE_2.

Figure 13:
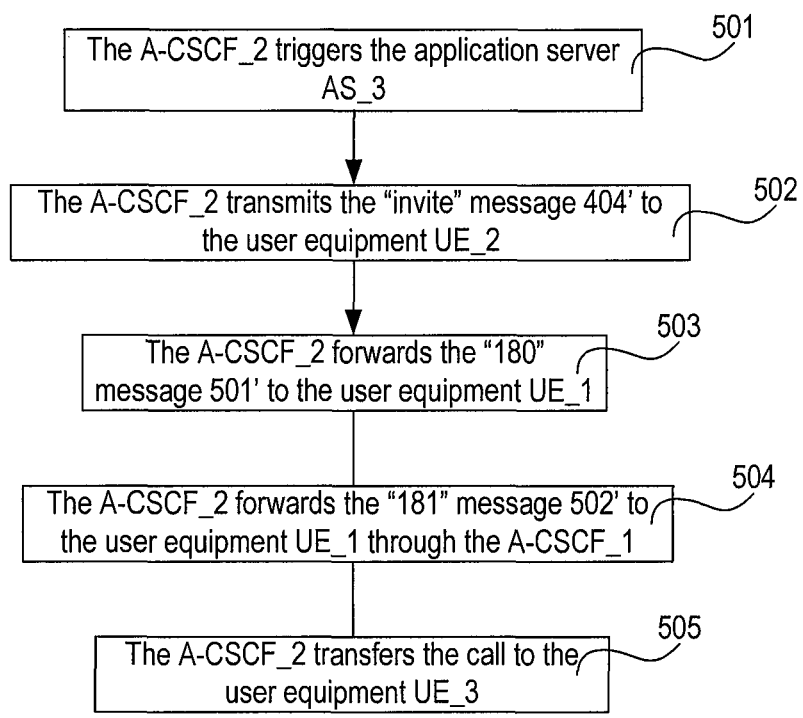
FIG. 13 is a flow chart of another embodiment of the method for establishing a session via an IP multimedia subsystem according to the invention.

For the user equipment UE_2 with subscription for a call-forward-on-no-answer service, the following operations are executed as illustrated in FIG. 12 and FIG. 13 after the A-CSCF_2 routes the "invite" message 401' to the application server AS_2 in the Process 405:

Process 501: The A-CSCF_2 further determines whether the "invite" message 404' satisfies a condition of triggering another application server; and the called number in the "invite" message 404' satisfies a condition of triggering an application server of call-forward-on-no-answer, e.g., an application server AS_3, in the present embodiment, and then the A-CSCF_2 transmits the "invite" message 404' to trigger the application server AS_3, and the application server AS_3 initiates a timer and also returns the "invite" message 404'.

Process 502: The A-CSCF_2 transmits to the user equipment UE_2 the "invite" message 404' returned from the application server AS_3; and the user equipment UE_2 returns a ring message ("180" message) 501' to the application server AS_3; and the application server AS_3 transmits the "180" message 501' to the A-CSCF_2.

Process 503: The A-CSCF_2 forwards the "180" message 501' to the user equipment UE_1 through the A-CSCF_1, and the user equipment UE_1 rings; the application server AS_3 determines from the timer whether the user equipment UE_2 responds in a predetermined period of time and transmits an answer forward message ("181" message) 502' to the A-CSCF_2 if exceeding the predetermined period of time.

Process 504: The A-CSCF_2 forwards the "181" message 502' to the user equipment UE_1 through the A-CSCF_1 to notify the caller of that the callee is transferring a call to a third user equipment, e.g., the user equipment UE_3.

Process 505: The A-CSCF_2 receives an "invite" message 503' initiated from the application server AS_3 and transfers the call to the user equipment UE_3 in a processing flow similar to a call initiation flow in the prior art.

Figure 14:
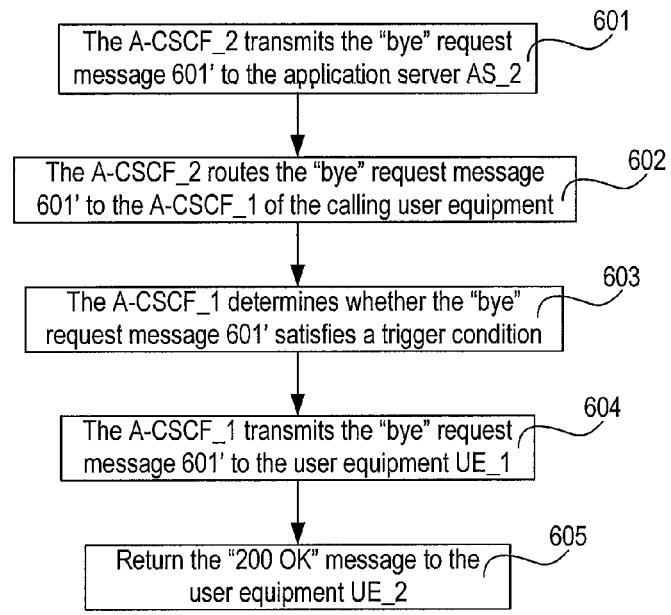
FIG. 14 is a flow chart of an embodiment of releasing a session in a method for establishing a session via an IP multimedia subsystem according to the invention.
Figure 15:
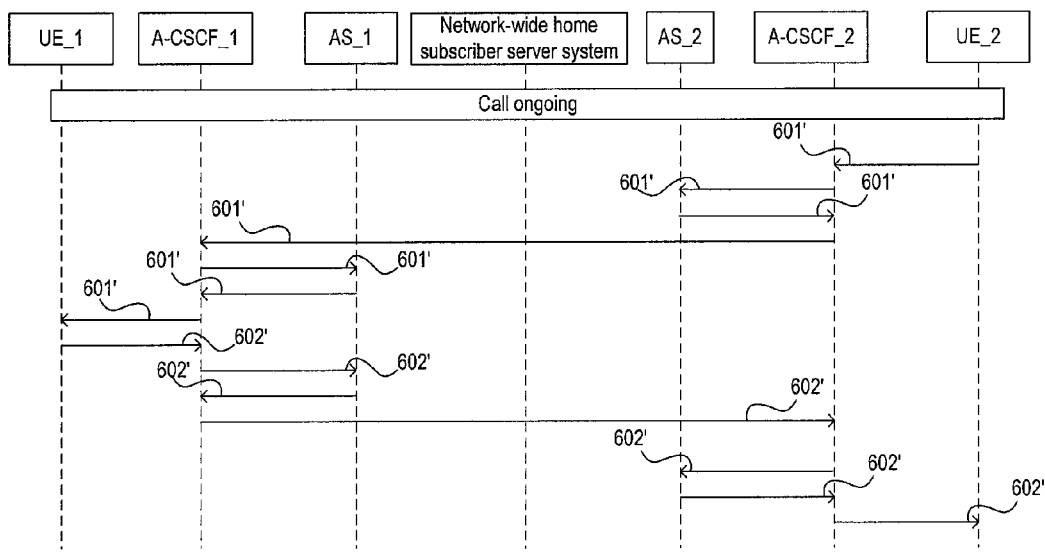
FIG. 15 is a flow chart of signaling corresponding to FIG. 14.
Figure 16:
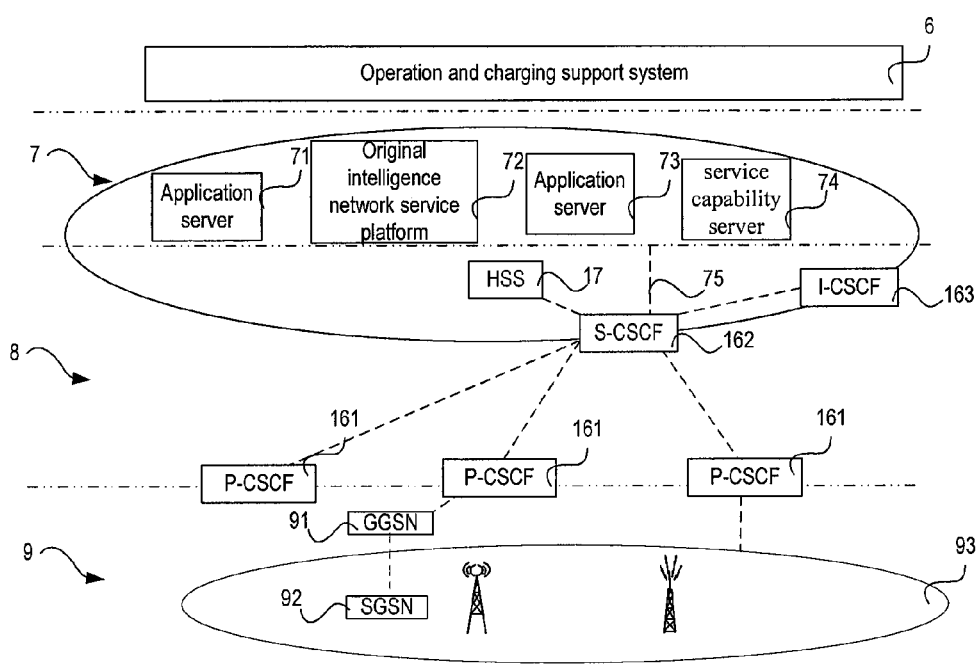
FIG. 16 is a structural schematic diagram of an IMS network in the prior art.
Figure 17:
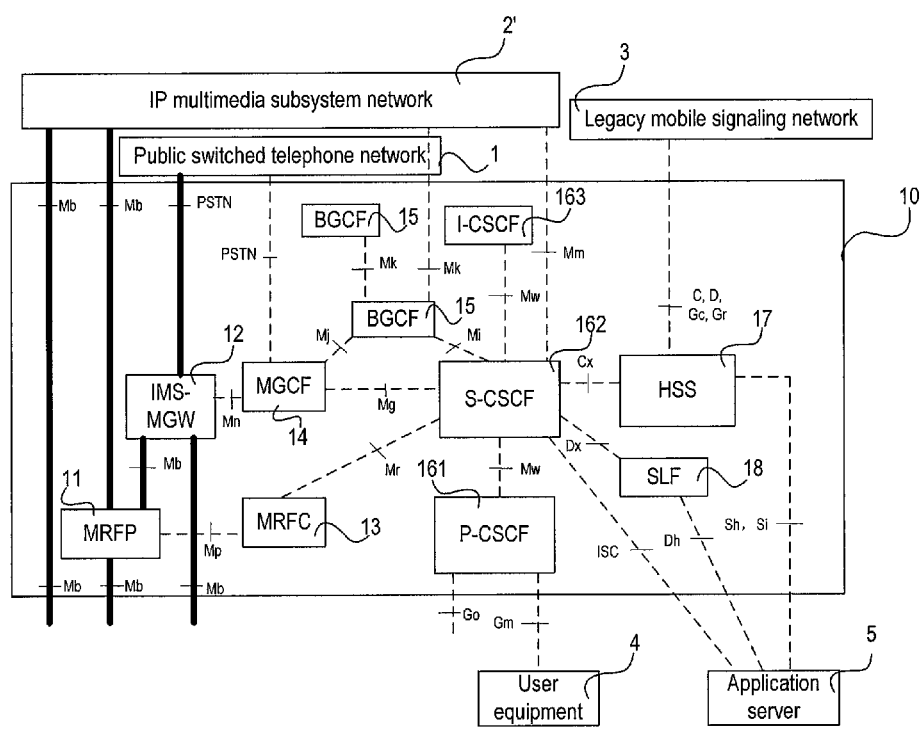
FIG. 17 is a structural schematic diagram of an IP multimedia subsystem in the prior art.

After establishing the session according to the foregoing embodiments, the A-CSCF may further release the session in the case of completing the session. As illustrated in FIG. 14 and FIG. 15, for example, initiation of a release request message from the called user equipment particularly includes:

Process 601: The called user equipment UE_2 transmits a "bye" request message 601'; the A-CSCF_2 determines whether the "bye" request message 601' satisfies a condition of triggering an application server upon reception of the "bye" request message 601' and transmits the "bye" request message 601' to the application server AS_2 if it satisfies the condition of triggering, for example, the application server AS_2, and the application server AS_2 analyzes the received "bye" request message 601' to execute a corresponding operation and transmits the processed "bye" request message 601' to the A-CSCF_2. Otherwise, the flow goes to Process 602.

Process 602: The A-CSCF_2 routes the "bye" request message 601' to the A-CSCF_1 of the calling user equipment.

Process 603: The A-CSCF_1 determines whether the "bye" request message 601' satisfies a trigger condition and performs triggering as a result of determination.

Process 604: The A-CSCF_1 transmits the "bye" request message 601' to the calling user equipment UE_1, and the user equipment UE_1 returns a "200 OK" message 602'.

Process 605: The "200 OK" message 602' is processed similarly to the foregoing flow and returned to the user equipment UE_2 to release the session.

The session release request message may alternatively be initiated from the calling user equipment, the A-CSCF of the calling end, the application server or the A-CSCF of the called party and processed in a similar flow to a session release flow in the prior art except that it is performed by the access session controller.

The present embodiment can enable the "invite" message to be received through the A-CSCF to thereby avoid both multiple forwarding thereof among P-CSCFs, S-CSCFs and I-CSCFs of the calling and called parties before being forwarded to the CSCF of the called party and multiple forwarding thereof among the P-CSCF, the S-CSCF and the I-CSCF of the called party before the AS is triggered, so that the "invite" message can be routed from the caller A-CSCF to the callee A-CSCF directly after be transmitted from the user equipment and the callee A-CSCF can trigger the AS according to the "invite" message to thereby simplify greatly the session establishment or call flow, shorten the period of time for session establishment and improve the session establishment efficiency.

It should be noted that the foregoing embodiments are merely intended to illustrate but not to limit the technical solutions of the invention. Although the invention has been detailed in connection with the foregoing embodiments, it should be appreciated to those ordinarily skilled in the art that the technical solutions recited in the foregoing respective embodiments can be modified or partial technical features of the solutions can be substituted equivalently without departing from the scope of the technical solutions in the respective embodiments of the invention.

What is claimed is:

1. An IP multimedia subsystem, comprising an access session controller and a network-wide home subscriber server system,
    wherein the access session controller comprises:
        a message reception module adapted to receive a call request message and a response message from a user or a call request message and a response message from a network device;
        a service trigger configuration module adapted to configure trigger information;
        a session control module adapted to generate a command for transmitting a message triggering a corresponding application server and establish, maintain and release a session upon determining from the trigger information configured by the service trigger configuration module that the call request message or the response message satisfies a condition of triggering the application server, and to generate, during establishment of the session, a command to transmit the call request message directly to an access session controller at the side of a called user or a corresponding breakout gateway control function module; and
        a message transmission module adapted to transmit the message according to the command from the session control module,
    wherein the network-wide home subscriber server system is connected with the access session controller and adapted to store network-wide subscriber information and indexes thereof for inquiring by the access session controller,
    wherein the message reception module is further adapted to receive a registration message from a user, and
    wherein the access session controller further comprises:
        a registration control module adapted to interact with the network-wide home subscriber server system according to the registration message to control a registration procedure of the user.

2. The IP multimedia subsystem of claim 1, wherein the access session controller further comprises:
    a routing module adapted to obtain address information for next-hop forwarding of the message according to a user identifier in the call request message; the session control module is further adapted to generate from the address information obtained by the routing module a command to forward the call request message; and the message transmission module is further adapted to transmit the call request message according to the command to forward the call request message.

3. The IP multimedia subsystem of claim 2, wherein the access session controller further comprises:

a signaling compression module adapted to compress the call request message.

4. The IP multimedia subsystem of claim 2, wherein the access session controller further comprises:
a charging module adapted to charge for the session established according to the call request message.

5. The IP multimedia subsystem of claim 1, wherein the network-wide home subscriber server system comprises:
a first storage module adapted to store the indexes of the network-wide subscriber information; and
a second storage module adapted to store the network-wide subscriber information corresponding to the indexes of the network-wide subscriber information.

6. A method for establishing a session via an IP multimedia subsystem, comprising:
receiving a call request message by an access session controller in the IP multimedia subsystem;
triggering, by the access session controller, a corresponding application server upon determining from configured trigger information that the call request message satisfies a condition of triggering the application server; and
establishing, by the access session controller, a session according to a message returned from the corresponding application server, wherein before the access session controller determines from the configured trigger information that the call request message satisfies the condition of triggering the application server;
transmitting, by the access session controller, a multimedia authentication request message to a network-wide home subscriber server system upon reception of a registration request message transmitted from the user equipment;
returning, by the network-wide home subscriber server system, to the access session controller an authentication condition for a user transmitting the registration request message;
retrieving, by the access session controller, authentication information of the user from the user equipment, transmitting a server assignment request message to the network-wide home subscriber server system upon determining that the authentication information satisfies the authentication condition; returning a registration success message to the user upon reception of a server assignment answer message and relevant data of the user returned from the network-wide home subscriber server system; and transmitting a registration failure message to the user upon determining that the authentication information does not satisfy the authentication condition;
transmitting, by the access session controller, a location information request message to a network-wide home subscriber server system upon determining from the configured trigger information that the call request message does not satisfy the condition of triggering the application server;
returning, by the network-wide home subscriber server system, information of an access session controller at the side of a called user;
forwarding, by the access session controller, the call request message to the access session controller of the called user according to the information of the access session controller at the side of the called user; and triggering, by the access session controller of the called user, a corresponding application server of the called user upon determining from stored trigger information that the call request message satisfies a condition of triggering the application server, and establishing the session according to a message returned from the application server of the called user.

7. The method of claim 6, wherein establishing the session by the access session controller according to the message returned from the corresponding application server comprises:
returning, by the access session controller, a response message to the user equipment according to the message returned from the corresponding application server; and
establishing, by the user equipment, a session connection with the corresponding application server through the access session controller.

8. The method of claim 6, wherein establishing the session by the access session controller according to the message returned from the corresponding application server comprises:
transmitting, by the access session controller, a location information request message to a network-wide home subscriber server system according to the message returned from the corresponding application server;
returning, by the network-wide home subscriber server system, information of an access session controller at the side of a called user;
transmitting, by the access session controller, the call request message to the corresponding access session controller of the called user according to the information of the access session controller at the side of the called user; and
determining, by the access session controller of the called user, from stored trigger information, whether the call request message satisfies a condition of triggering an application server, and if the call request message satisfies a condition of triggering an application server, triggering the corresponding application server of the called user; otherwise, routing the call request message to the called user.

9. The method of claim 6, wherein establishing the session by the access session controller according to the message returned from the corresponding application server comprises:
further triggering, by the access session controller, a corresponding application server upon determining from the message returned from the corresponding application server that the call request message satisfies a condition of triggering the application server.

10. The method of claim 6, wherein triggering by the access session controller of the called user the corresponding application server of the called user comprises: triggering in sequence, by the access session controller of the called user, all application servers that can be triggered with the call request message.

11. The method of claim 6, further comprising: releasing, by the access session controller, the session after the session is established.

* * * * *